United States Patent
Tang et al.

(10) Patent No.: US 10,127,157 B2
(45) Date of Patent: Nov. 13, 2018

(54) SIZING A CACHE WHILE TAKING INTO ACCOUNT A TOTAL BYTES WRITTEN REQUIREMENT

(71) Applicant: SK hynix Inc., Gyeonggi-do OT (KR)

(72) Inventors: Xiangyu Tang, San Jose, CA (US); Frederick K. H. Lee, Mountain View, CA (US)

(73) Assignee: SK Hynix Inc., Gyeonggi-do (KR)

( * ) Notice: Subject to any disclaimer, the term of this patent is extended or adjusted under 35 U.S.C. 154(b) by 541 days.

(21) Appl. No.: 14/843,632

(22) Filed: Sep. 2, 2015

(65) Prior Publication Data

US 2016/0098350 A1 Apr. 7, 2016

Related U.S. Application Data

(60) Provisional application No. 62/060,387, filed on Oct. 6, 2014.

(51) Int. Cl.
*G06F 12/08* (2016.01)
*G06F 12/0871* (2016.01)

(52) U.S. Cl.
CPC .. *G06F 12/0871* (2013.01); *G06F 2212/1021* (2013.01); *G06F 2212/1041* (2013.01); *G06F 2212/222* (2013.01); *G06F 2212/313* (2013.01); *G06F 2212/604* (2013.01)

(58) Field of Classification Search
None
See application file for complete search history.

(56) References Cited

U.S. PATENT DOCUMENTS

| | | | | |
|---|---|---|---|---|
| 7,350,046 B2* | 3/2008 | Sicola | ............ | G06F 11/0727 711/111 |
| 7,496,715 B1* | 2/2009 | Vartti | ............ | G06F 12/0888 711/144 |
| 7,577,787 B1* | 8/2009 | Yochai | ............ | G06F 12/0804 711/113 |
| 7,865,658 B2* | 1/2011 | Lasser | ............ | G06F 12/0804 711/103 |
| 8,112,585 B2* | 2/2012 | Patel | ............ | G06F 12/121 711/118 |
| 8,166,229 B2* | 4/2012 | Tetrick | ............ | G06F 12/0866 711/100 |
| 8,386,701 B2* | 2/2013 | Tetrick | ............ | G06F 12/0866 711/1 |
| 8,694,754 B2* | 4/2014 | Schuette | ............ | G06F 3/0616 711/103 |
| 8,706,968 B2* | 4/2014 | Flynn | ............ | G06F 11/108 711/120 |

(Continued)

OTHER PUBLICATIONS

Webopedia, "RAM", Jan. 6, 2016, pp. 1-3, https://web.archive.org/web/20160106065536/https://www.webopedia.com/TERM/R/RAM.html (Year: 2016).*

(Continued)

*Primary Examiner* — Christopher D Birkhimer
(74) *Attorney, Agent, or Firm* — IP & T Group LLP

(57) ABSTRACT

A total bytes written (TBW) requirement associated with solid state storage is obtained. A size of a cache associated with the solid state storage is determined based at least in part on the TBW requirement. The size of the cache is adjusted to be the determined size

20 Claims, 10 Drawing Sheets

(56) References Cited

U.S. PATENT DOCUMENTS

| | | | | |
|---|---|---|---|---|
| 8,775,737 | B2* | 7/2014 | Hsieh | G06F 12/023 711/118 |
| 8,788,745 | B2* | 7/2014 | Tanaka | G06F 12/0246 711/103 |
| 8,825,718 | B2* | 9/2014 | Wolczko | G06F 12/0276 707/813 |
| 8,825,937 | B2* | 9/2014 | Atkisson | G06F 12/0246 711/102 |
| 8,838,891 | B2* | 9/2014 | Bert | G06F 12/0246 711/114 |
| 2008/0162611 | A1* | 7/2008 | Wolczko | G06F 12/0276 |
| 2009/0172286 | A1* | 7/2009 | Lasser | G06F 12/0804 711/127 |
| 2010/0281216 | A1* | 11/2010 | Patel | G06F 12/121 711/118 |
| 2012/0144092 | A1* | 6/2012 | Hsieh | G06F 12/023 711/103 |
| 2012/0221774 | A1* | 8/2012 | Atkisson | G06F 12/0802 711/103 |
| 2013/0067138 | A1* | 3/2013 | Schuette | G06F 3/0616 711/103 |
| 2013/0166816 | A1* | 6/2013 | Atkisson | G06F 12/0802 711/102 |
| 2013/0166831 | A1* | 6/2013 | Atkisson | G06F 12/0802 711/103 |
| 2013/0232297 | A1* | 9/2013 | Tanaka | G06F 12/0246 711/103 |
| 2013/0297880 | A1* | 11/2013 | Flynn | G06F 1/183 711/128 |
| 2013/0346812 | A1* | 12/2013 | Bahirat | G11C 16/349 714/704 |
| 2014/0095775 | A1* | 4/2014 | Talagala | G06F 12/0866 711/103 |
| 2014/0237160 | A1* | 8/2014 | Dong | G06F 12/0864 711/102 |
| 2014/0258596 | A1* | 9/2014 | Kojima | G06F 12/0246 711/103 |
| 2014/0281142 | A1* | 9/2014 | Nemazie | G06F 12/0246 711/103 |

OTHER PUBLICATIONS

Webopedia, "ROM", Jan. 13, 2016, pp. 1-2, https://web.archive.org/web/20160113230721/https://www.webopedia.com/TERM/R/ROM.html (Year: 2016).*

Webopedia, "Semiconductor", Apr. 11, 2001, pp. 1 3, https://web.archive.org/web/20010411032159/https://www.webopedia.com/TERM/S/semiconductor.html (Year: 2001).*

Hong et al., "NAND Flash-based Disk Cache Using SLC/MLC Combined Flash Memory", 2010, International Workshop on Storage Network Architecture and Parallel I/Os, IEEE, pp. 21-30 (Year: 2010).*

Margaret Rouse, "Wear Leveling", 2012, pp. 1-4, http://searchstorage.techtarget.com/definition/wear-leveling (Year: 2012).*

Lee et al., Improving Performance and Capacity of Flash Storage Devices by Exploiting Heterogeneity of MLC Flash Memory, IEEE Transactions on Computers, Oct. 2014, p. 2445-2458, vol. 63, No. 10, IEEE.

\* cited by examiner

SIZING A CACHE WHILE TAKING INTO ACCOUNT A TOTAL BYTES WRITTEN REQUIREMENT

CROSS REFERENCE TO OTHER APPLICATIONS

This application claims priority to U.S. Provisional Patent Application No. 62/060,387 entitled MANAGEMENT SCHEMES FOR NAND FLASH WITH VARIABLE-SIZED CACHE filed Oct. 6, 2014 which is incorporated herein by reference for all purposes.

BACKGROUND OF THE INVENTION

In some solid state storage systems, a small portion of the solid state storage media or drive is designated as cache. (Note that this cache is on the solid state storage media itself, as opposed to being on the (solid state) storage controller.) In some cases, the cache is implemented using single-level cells (SLC) where each cell stores 1 bit and the regular drive (i.e., the rest of the solid state storage media not in the cache) uses some denser cell technology, such as multi-level cell (MLC) where each cell stores 2 bits or tri-level cell (TLC) where each cell stores 3 bits. As a result of the different densities, the cache will have faster read and write times, is more error tolerant, and can withstand more program and erase (P/E) cycles than the regular drive. The downside is that a block in the cache will have a smaller capacity than a block in the regular drive because of the bit density differences between SLC and MLC (or TLC). New techniques which are better able to pick the size of a cache (e.g., during a mode where the cache is permitted to vary in size) would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
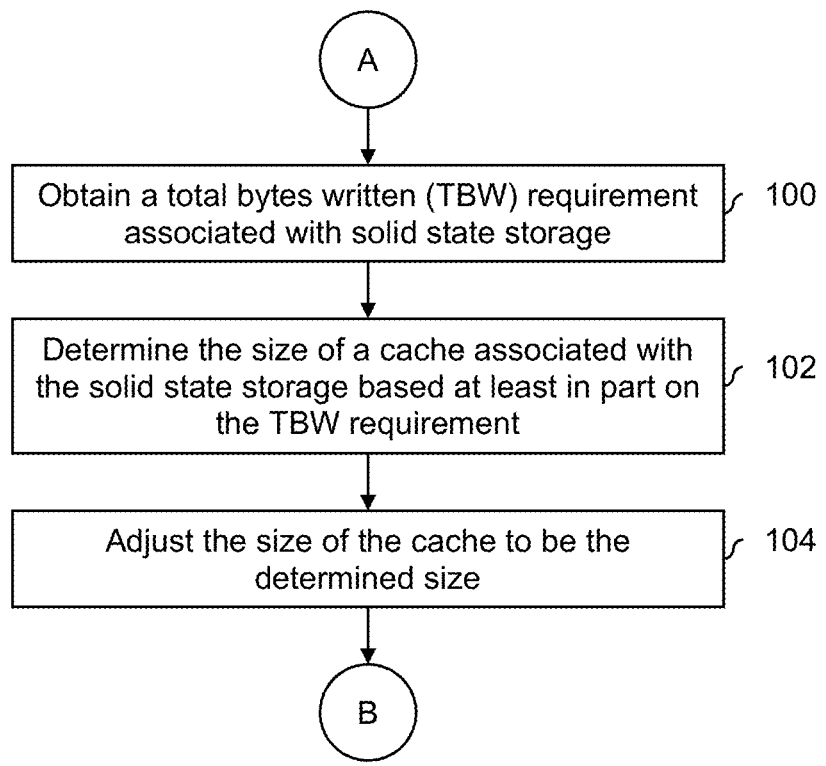
FIG. 1 is a flowchart illustrating an embodiment of a process to size a cache based at least in part on a total bytes written (TBW) requirement.

FIG. 1 is a flowchart illustrating an embodiment of a process to size a cache based at least in part on a total bytes written (TBW) requirement. For example, the process may be used to size (e.g., once or multiple times, if desired) a cache in the solid state storage media or drive so that response time is improved or optimized without making the cache so large that a TBW requirement is violated (e.g., in the future). In some embodiments, the process is performed by a solid state storage controller which controls how a solid state storage drive or media is divided into a cache portion and a regular drive portion. In some embodiments, the process is performed during a variable size mode or period when the cache is permitted to vary in size.

At 100, a total bytes written (TBW) requirement associated with solid state storage is obtained. Unlike other types of storage such as hard disk drives (HDD), solid state storage wears out with use. More specifically, program and erase (P/E) cycles break down the electrical insulation in solid state storage cells, making them "leakier" with respect to charge as the number of P/E cycles experienced by the solid state storage media increases. For simplicity, it is sometimes assumed that solid state storage cells are worn out when some maximum number of P/E cycles has been reached. In light of how solid state storage gets worn out from programming and erasing, systems manufacturers often have a total bytes written (TBW) requirement that solid state storage media manufacturers must meet.

A TBW requirement is typically with respect to the amount of write data sent from a host to a solid state storage controller. This means that the more write amplification (WA) there is (e.g., where WA is defined as the ratio of the total number of writes (e.g., host writes plus overhead writes) to the solid state storage media or drive versus the number of host writes), the more robust the solid state storage media will have to be in order to withstand the additional overhead writes which result from the larger WA value. In one example, a 256 GB solid state storage drive has a 1 TB TBW requirement associated with it. If all of the writes were spread out evenly over the solid state storage media, then each block (or, more generally, location) would be written approximately 4 times. It is noted, however, that any sequence or combination of write locations must be supported, and so the solid state storage media must (also) be able to tolerate 1 TB of write data sent to the same logical block address (as an example).

At 102, the size of a cache associated with the solid state storage is determined based at least in part on the TBW requirement. Some examples of this are described in further detail below.

At 104, the size of the cache is adjusted to be the determined size. In some embodiments, the size of the cache may be adjusted as many times as desired during a variable size mode. In one example, for simpler systems (e.g., consumer products with limited processing capabilities), the size of the cache may be sized once at the beginning of the variable size mode. For systems where performance is more of a concern and there are more processing resources available (e.g., enterprise systems), the size of the cache may be re-sized as many times as desired during the variable size mode.

A cache typically has a lower bit density than the regular drive. In some examples described below, the cache stores 1 bit per cell while the regular drive stores 2 bits per cell. Since the total number of blocks (i.e., in the cache plus in the regular drive) is fixed (independent of what size the cache it set to), increasing the size of the cache decreases the total or overall storage capacity since the cache typically has fewer bits per block.

A smaller total storage capacity (resulting from an increased cache size) means that host writes and overhead writes are more concentrated, causing more programs and erases to be experienced per block. The danger is that if the cache is too large, the TBW requirement will be violated because the too-large cache will cause the P/E count to exceed the maximum P/E count (e.g., at which the block is assumed to wear out). To put it another way, there is a tradeoff between the size of the cache and the margin with which the TBW requirement is met (e.g., measured in terms of excess or remaining P/E cycles before a block wears out at the maximum P/E count).

In some embodiments, the process of FIG. 1 is used to select the largest possible size of the cache to improve performance, but not so large that it causes the TBW requirement to be violated (e.g., because some maximum number of P/E cycles is exceeded). That is, the technique enables the cache to be sized so that the system has improved performance at the expense of less margin for meeting the TBW requirement (e.g., when the TBW requirement is satisfied, the cells are close to wearing out but have not actually reached some maximum P/E cycle count at which they are assumed for simplicity to fail).

One benefit to varying the size of the cache (e.g., as opposed to keeping the size of the cache fixed throughout the lifetime of the solid state storage system) is that the throughput of the system can be increased (where a larger cache size is desirable because it enables a faster response time when there is a cache hit) to the degree permitted by the TBW requirement, without actually violating the TBW requirement.

The following figure shows an example of a solid state storage system which performs the process described in FIG. 1.

Figure 2:
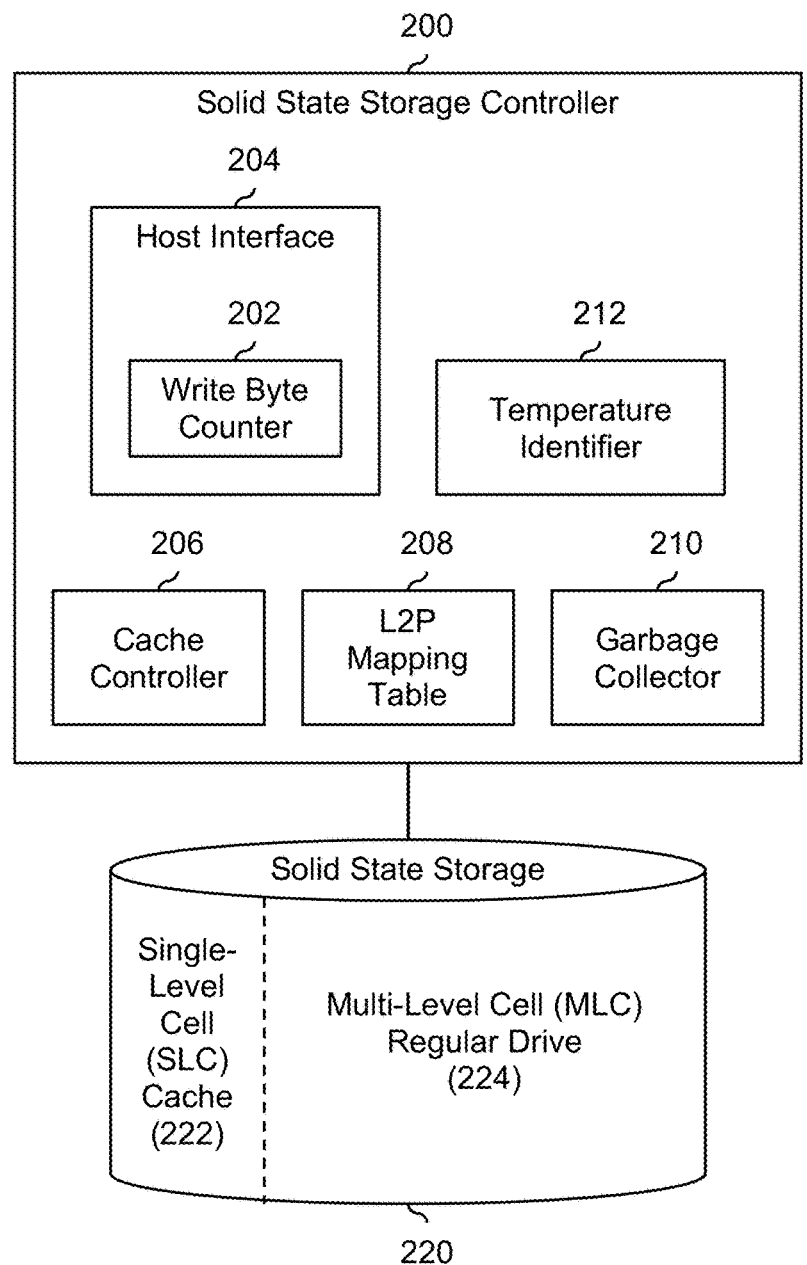
FIG. 2 is a diagram illustrating an embodiment of a solid state storage system which includes a variable-sized cache.

FIG. 2 is a diagram illustrating an embodiment of a solid state storage system which includes a variable-sized cache. Solid state storage controller 200 is one example of a system that performs the process of FIG. 1. In some embodiments, solid state storage controller 200 is a semiconductor device, such as an application-specific integrated circuit (ASIC) or a field-programmable gate array (FPGA).

In the example shown, solid state storage 220 is divided into a cache (222) and a regular drive (224). In this particular example, the cache is implemented using single-level cells (SLC) which store 1 bit per cell. Cache 222 is implemented as SLC so that it can be read back faster with fewer errors. Since there are only two distributions (e.g., one for 0 and one for 1), the voltage distributions are located further apart and thus there are fewer read-back errors and fewer cycles of error correction decoding that need to be performed.

In contrast, regular drive 224 is implemented using multi-level cells (MLC) which store 2 bits per cell. As a result, there are 4 distributions (e.g., one for 00, one for 01, one for 10, and one for 11) and they must be squeezed into the same voltage range as the two SLC distributions. The MLC distributions are thus closer together than the SLC distributions and so more read-back errors will occur and more error cycles of error correction decoding will need to be performed. This is why SLC cache 222 can be read back faster with fewer errors than MLC regular drive 224. In some embodiments, regular drive 224 is implemented using tri-level cells (TLC) which store 3 bits per cell.

Host interface 204 receives read instructions and write instructions from a host (not shown). Inside host interface 204 is a write byte counter (202) which counts the amount of write data received from the host. In some embodiments, the value of $TBW_P(t)$, the amount of host data that has already been written and that counts toward the TBW requirement, is obtained from write byte counter 202.

In this example, cache controller 206 periodically determines the size of cache 222 and is one example of a component which performs step 102 in FIG. 1. In some embodiments, logical to physical (L2P) mapping table 208 is used to record what portion of solid state storage 220 belongs to cache 222 versus regular drive 224. For example, L2P mapping table 208 may include the range of (e.g., physical) addresses which are in cache 222 and regular drive 224.

In some embodiments, solid state storage 220 is configured to support a cache, the size of which is configurable or otherwise adjustable. In some such embodiments, solid state storage 220 may expose interfaces or controls to solid state storage controller 200 to specify the bit density for cache 222 and regular drive 224 (e.g., SLC, MLC, tri-level cell (TLC), etc.) and which (e.g., physical) addresses are in the cache versus the regular drive.

In one example of how cache 222 and regular drive 224 are used, the host (not shown) is aware that there is a cache and has the ability to flag, tag, or otherwise indicate (if desired) what host write data should be stored in cache 222 versus regular drive 224. For example, if a host write received by host interface 204 includes a cache tag, that write data is stored in cache 222. If not, it is stored in regular drive 224.

Alternatively, the host is unaware of the cache and/or does not have control over what host write data is stored in the cache. In one example of such a system, temperature identifier 212 determines a temperature for write data received from a host. Data is hot if it will be (or is at least believed to be) invalidated or otherwise overwritten shortly in the future. Data is cold if it will remain valid (i.e., will not be overwritten) for a long time. Host write temperature identifier 212 may use any appropriate technique to determine the temperature of write data received from a host. Based on the temperature determined by temperature identifier 212, hot data is stored in cache 222 and cold data is stored in regular drive 224. These examples of how data is assigned to cache 222 versus regular drive 224 are merely illustrative and are not intended to be limiting.

As will be described in more detail below, to adjust the size of cache 222 (see, e.g., step 104 in FIG. 1), garbage collector 210 may be used in some embodiments. Alternatively, there may already be (e.g., without performing garbage collection) enough free blocks (i.e., blocks which are empty and available to be written) in either cache 222 or regular drive 224 to be reassigned to the other and adjusting the size is a relatively straightforward process (e.g., cache controller 206 updates the information stored in logical to physical mapping table 208 so that empty blocks are moved from cache 222 to regular drive 224 or vice versa).

In some embodiments, solid state storage 220 includes some additional capacity (e.g., not advertised) called overprovisioning. For example, a (supposedly) 1 GB drive with 7% of overprovisioning would actually have 1.07 GB of actual storage space.

In some embodiments, a solid state storage system starts out in a variable size mode (e.g., where the size of cache 222 is permitted to vary) and ends in a fixed size mode (e.g., where the size of cache 222 is fixed). The following figure shows one example of this.

Figure 3:
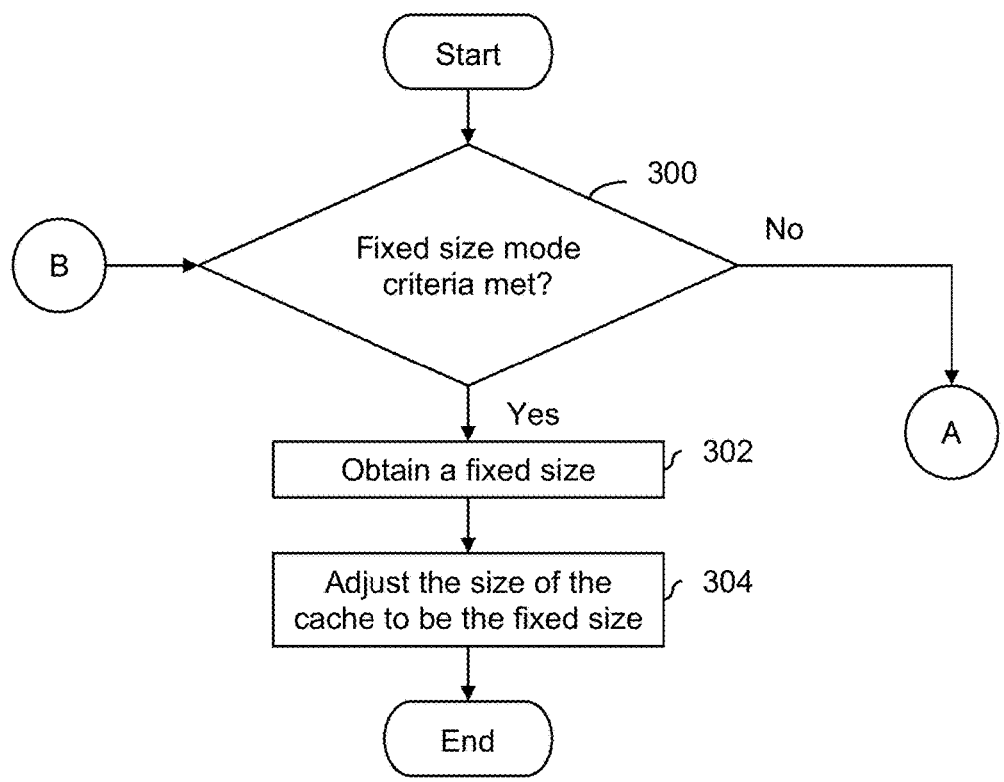
FIG. 3 is a flowchart illustrating an embodiment of a process to determine whether a solid state storage system is in a variable size mode or a fixed size mode.

FIG. 3 is a flowchart illustrating an embodiment of a process to determine whether a solid state storage system is in a variable size mode or a fixed size mode. In some embodiments, the process is performed by a solid state storage controller.

At 300, it is determined if one or more fixed size mode criteria have been met. For example, suppose there is some value $PE_R$ which is the number of P/E cycles that can be experienced by the solid state storage media during variable size mode before switching over to fixed size mode. For example, all program and erase operations to the solid state storage media (e.g., either to the cache or the regular drive) would count towards this $PE_R$ value. If the P/E count (e.g., for the entire solid state storage media or drive as a whole) met the $PE_R$ value, then the exemplary fixed size mode criteria would be met.

As will be described in more detail below, changing the size of the cache (e.g., from a first/starting cache size to a second cache size during variable size mode) sometimes corresponds to changing the $PE_R$ value (e.g., from a first/starting $PE_R$ value to a second $PE_R$ value). Thus, in some embodiments, the decision or test at step 300 includes determining if the P/E count matches the current or most recent $PE_R$ value.

If the fixed size mode criteria is met, a fixed size is obtained at 302. For example, there may be some predefined size to which the cache should be set. In some embodiments, the size calculation at step 102 in FIG. 1 assumes a certain size of the cache during fixed size mode and this size used in the calculation is obtained at step 302.

At 304, the size of the cache is adjusted to be the fixed size. In some embodiments, garbage collection is used to re-size the cache and regular drive. In some embodiments, there are enough free blocks in the cache and regular drive so that the re-sizing process is relatively straightforward.

The process then ends, because the size of the cache is subsequently not permitted to change once it is in fixed size mode.

If the fixed size mode criteria is not met at step 300, then the process of FIG. 1 is performed because the system is (still) in variable size mode. It is noted that it may be undesirable to constantly re-calculate the cache size and continually adjust it, and so the process of FIG. 1 may not immediately start up after the process exits step 300 via the No path.

After the process of FIG. 1 ends, it is determined (again) at step 300 if the fixed size mode criteria has been met. That is, the system starts out in variable size mode and is permitted to go from variable size mode to fixed size mode, but the system is not permitted to go from fixed size mode to variable size mode.

The following figures describe more specific examples of how the size of a cache is determined at step 102 in FIG. 1. First, a detailed example is discussed. Then, some generalizations about the detailed example are discussed.

$TBW_R$ (t) is the amount of data (e.g., in MB, TB, etc.) that remains to be written at time t (e.g., in order to satisfy the TBW requirement). For example, the subscript R stands for remaining $TBW_R$ (t) can be written as:

$$TBW_R(t) = \frac{C(t)PE_R}{WA(s)} + \min\left(\frac{PE^{cache}C^{cache}}{WA^{cache}}, \frac{PE^{regular}C^{regular}}{WA^{regular}}\right) \quad (1)$$

where:

TABLE 1

Inputs in Equation (1)

| Input | Description |
|---|---|
| $PE_R$ | The remaining number of P/E cycles until the variable size mode ends and the fixed size mode begins. Note that this number relates to the solid state storage media as a whole and thus program or erase operations performed either on the cache or the regular drive would count toward this remaining number. |
| $PE^{cache}$ | The average remaining number of P/E cycles for (all) cache blocks once fixed size mode is entered. For example, given the (current) value of $PE_R$ and a predefined size of the cache once fixed size mode begins, a certain number of P/E cycles will have to be supported by the cache during fixed size mode in order to meet the TBW requirement and thus $PE^{cache}$ may be calculated. |

TABLE 1-continued

Inputs in Equation (1)

| Input | Description |
|---|---|
| $PE^{regular}$ | The average remaining number of P/E cycles for (all) regular drive blocks once fixed size mode is entered. $PE^{regular}$ may be calculated in a manner similar to $PE^{cache}$. |
| C(t) | The capacity of the solid state storage drive (e.g., as a whole) at time t. The capacity will depend upon the bit density of the cache (e.g., 1 bit per cell if the cache is SLC), the bit density of the regular drive (e.g., 2 bits per cell if the regular drive is MLC), the size of the cache, and the size of the regular drive (e.g., which depends upon the size of the cache). Note that C(t) must be greater than the size of user data stored in the solid state storage drive. |
| $C^{cache}$ | The capacity of the cache after entering fixed size mode. For example, this is a predefined value. |
| $C^{regular}$ | The capacity of the regular drive after entering fixed size mode. As with $C^{cache}$, this may be a predefined value. |
| WA(s) | The write amplification of the solid state storage drive during variable size mode when the cache has a size of s. Since changing the size of the cache affects total capacity, write amplification will also be affected by the size of the cache since more garbage collection will tend to be performed with a smaller capacity. |
| $WA^{cache}$ | The write amplification of the cache after fixed size mode is entered. |
| $WA^{regular}$ | The write amplification of the regular drive after fixed size mode is entered. Any appropriate technique may be used to obtain WA(s), $WA^{cache}$, and/or $WA^{regular}$, such as a closed-form analytical expression, a pre-determined table, or tracking (e.g., measuring) actual WA during the solid state storage drive's operation. In some embodiments, a combination of techniques is used. In one example, there is a write counter in the host interface and another write counter in the storage interface and the ratio of the two is used to obtain WA for that particular cache size. Any appropriate estimation or approximation technique may then be applied to one or more sampled data points (i.e., sampled combinations of s and WA). |

Some of the inputs in Equation (1) vary with s (i.e., the size of the cache), such as C (t) and WA(s). As described above, C (t) depends upon s because the cache and regular drive typically have different bit densities (e.g., SLC versus MLC) and so the total capacity will depend upon the size of the cache. Similarly, if the capacity varies with s then the write amplification will also vary with s. Suppose, for example, that the size of a cache is increased so that the capacity of the solid state storage drive (as a whole) decreases. This will tend to cause more garbage collection, which in turn will cause more write amplification.

Some of the inputs in Equation (1) vary with $PE_R$, such as $PE^{cache}$ and $PE^{regular}$. Since the sizes of the cache and regular drive during fixed size mode are predefined, the number of P/E cycles that need to be supported by the cache and regular drive depend upon how many P/E cycles will be handled or otherwise experienced during variable size mode (i.e., $PE_R$) so that they do not need to be handled later on during fixed size mode.

The remaining inputs $C^{cache}$, $C^{regular}$, $WA^{cache}$, and $WA^{regular}$ depend upon neither s nor $PE_R$.

$TBW_R$ (t) may also be written as follows, where the inequality is obtained from the TBW requirement:

$$TBW_R(t) \geq TBW(t) - TBW_P(t) \quad (2)$$

where $TBW_P$ (t) is the amount of data (e.g., in MB, TB, etc.) already written at time t (e.g., and which counts toward the TBW requirement). The subscript P, for example, may stand for past or previous. In one example, there is a counter in a host interface (e.g., which is in a solid state storage controller) which counts the amount of write data sent from a host to the solid state storage controller and $TBW_P$ (t) is obtained from such a counter.

The dependency of the inputs in Equation (1) on s, $PE_R$, or neither means that there are combinations of s and $PE_R$ for which Equation (2) is not violated. To put it another way, the size of the cache may be adjusted as many times as desired during the variable size mode where s and $PE_R$ are carefully chosen each time so that Equation (2) holds. For example, during an initial sizing at time 0, the size of the cache is set to $s_O$ and $PE_R$ is set to $PE_{R,O}$ where ($s_O$, $PE_{R,O}$) do not violate Equation (2). At a later point in time at time $t_1$ (still during variable size mode), the size of the cache may be set to $s_1$ and $PE_R$ is set to $PE_{R,1}$ where ($s_1$, $PE_{R,1}$) do not violate Equation (2). Suppose the current $PE_R$ value (which at this point in time is $PE_{R,1}$) is met because the solid state storage drive (as a whole) has experienced $PE_R$ P/E cycles. The system would then switch over to fixed size mode, for example by setting the size of the cache to some predefined size and setting the size of the regular drive to another predefined size.

The following figure shows example combinations of (s, $PE_R$) obtained using Equation (1) which do not cause Equation (2) to be violated.

Figure 4:
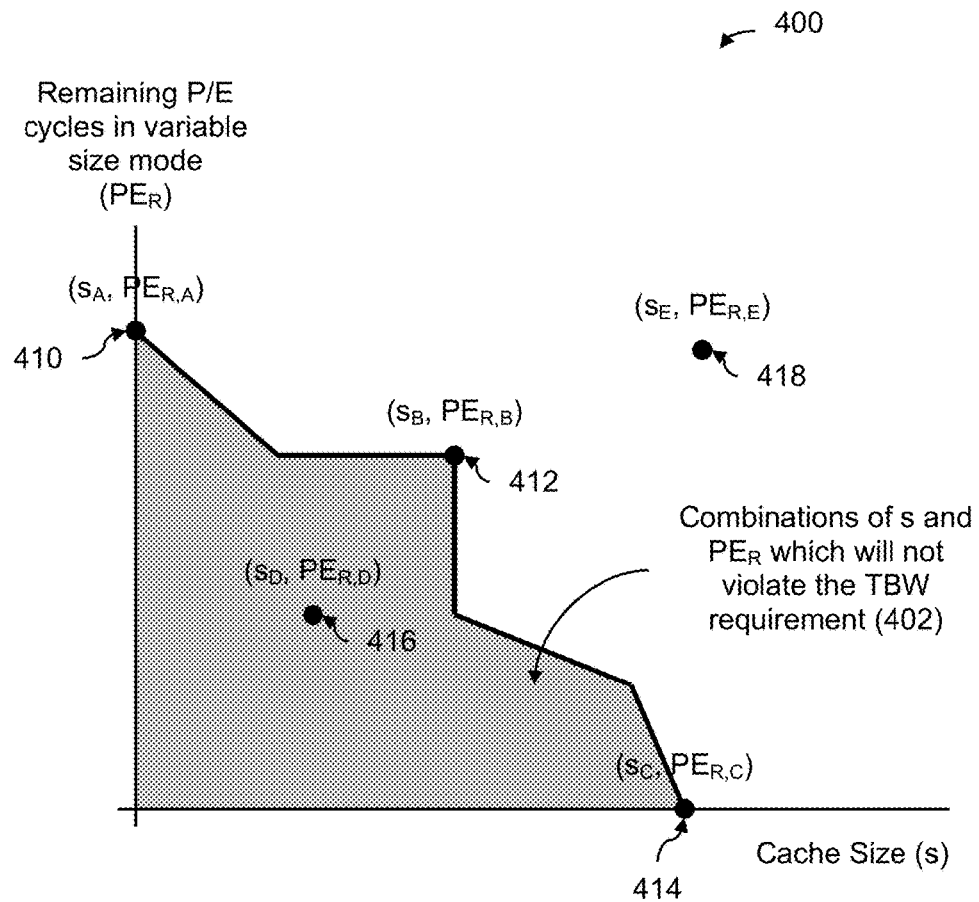
FIG. 4 is a diagram illustrating an embodiment of a plot of cache size (s) versus remaining P/E cycles in variable size mode ($PE_R$).

FIG. 4 is a diagram illustrating an embodiment of a plot of cache size (s) versus remaining P/E cycles in variable size mode ($PE_R$). In the example shown, the x-axis of diagram 400 is cache size (s) and the y-axis of diagram 400 is the remaining P/E cycles in variable size mode ($PE_R$).

The shaded area (402) shows the combinations of (s, $PE_R$) which will not violate the TBW requirement (e.g., expressed in Equation (2)). So long as a data point is picked in shaded area 402, the selected cache size is calculated to not violate the TBW requirement. For example, if data points A (410), B (412), C (414), or D (416) were selected, the corresponding combinations of cache sizes and remaining P/E cycles (i.e., ($s_A$, $PE_{R,A}$), ($s_B$, $PE_{R,B}$), ($s_C$, $PE_{R,C}$), and ($s_D$, $PE_{R,D}$)) would not violate the TBW requirement. In contrast, point E (418) (which is outside of shaded area 402) corresponds to a data point of ($s_E$, $PE_{R,E}$) which is a combination which would violate the TBW requirement.

For example, suppose point B (412) is selected. The cache would be set to a size of $s_B$ and the P/E count of $PE_{R,B}$ would be used to decide when to switch from variable size mode to fixed size mode.

In some embodiments, the cache size associated with point C (414) is selected because it optimizes throughput by selecting the largest cache size which will not violate the TBW requirement. For example, this might be desirable in applications where response time is a high priority. In some embodiments, the cache size associated with point B (412) is selected because it is a more balanced tradeoff between performance and the amount of margin with which the TBW requirement is satisfied. In some embodiments, the cache size associated with point A (410) is selected. This may be desirable in applications where response time is not a concern and it is important to have a lot of margin in meeting the TBW requirement.

Note that if desired, the cache may be re-sized as many times as desired during a variable size mode. Each time the process of FIG. 1 is performed, a new graph showing combinations of (s, $PE_R$) which do not violate the TBW requirement may be redrawn or recalculated. For example, newer or more current information may affect the inputs in Equation (1) which in turn affect the combinations of (s, $PE_R$) which will not violate the TBW requirement.

In the context of FIG. 1, step 102 may be performed in the following manner per the example shown in this figure.

Figure 5:
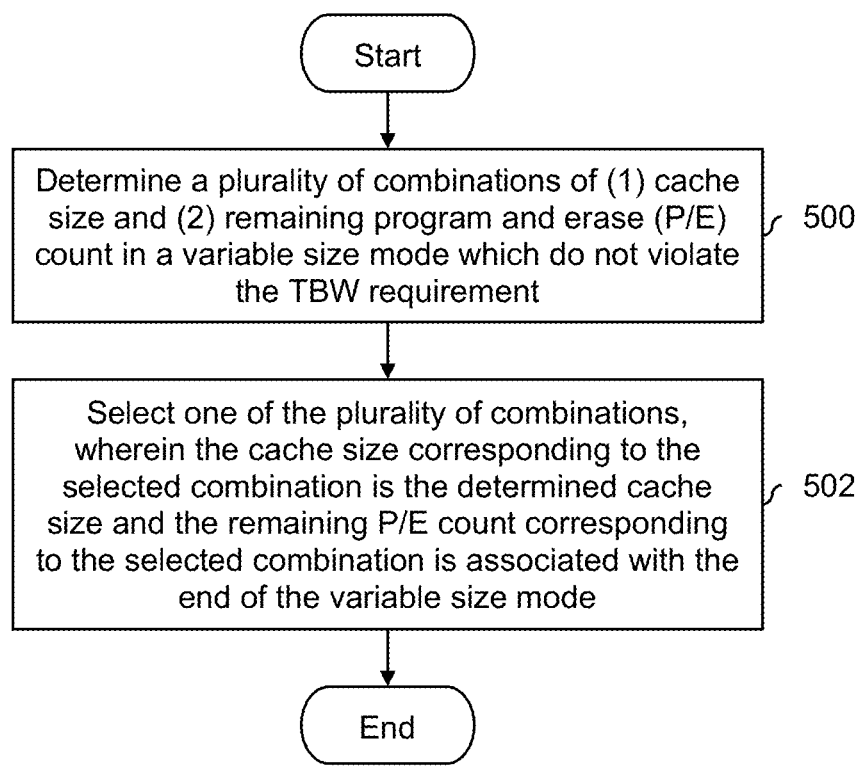
FIG. 5 is a flowchart illustrating an embodiment of a process to determine the size of a cache based at least in part on a TBW requirement.

FIG. 5 is a flowchart illustrating an embodiment of a process to determine the size of a cache based at least in part on a TBW requirement. In some embodiments, step 102 in FIG. 1 includes the process of FIG. 5.

At 500, a plurality of combinations of (1) cache size and (2) remaining program and erase (P/E) count in a variable size mode which do not violate the TBW requirement is determined. For example, in FIG. 4, the shaded area (402) shows the combinations of (s, $PE_R$) which do not violate the TBW requirement.

At 502, one of the plurality of combinations is selected, wherein the cache size corresponding to the selected combination is the determined cache size and the remaining P/E count corresponding to the selected combination is associated with the end of the variable size mode. Any appropriate selection technique may be employed (some examples are described above).

Returning to Equation (1), the determination of the cache size is performed during variable size mode but takes into account what state the solid state storage will be in during a later, fixed size mode. The following figure shows an example of this.

Figure 6:
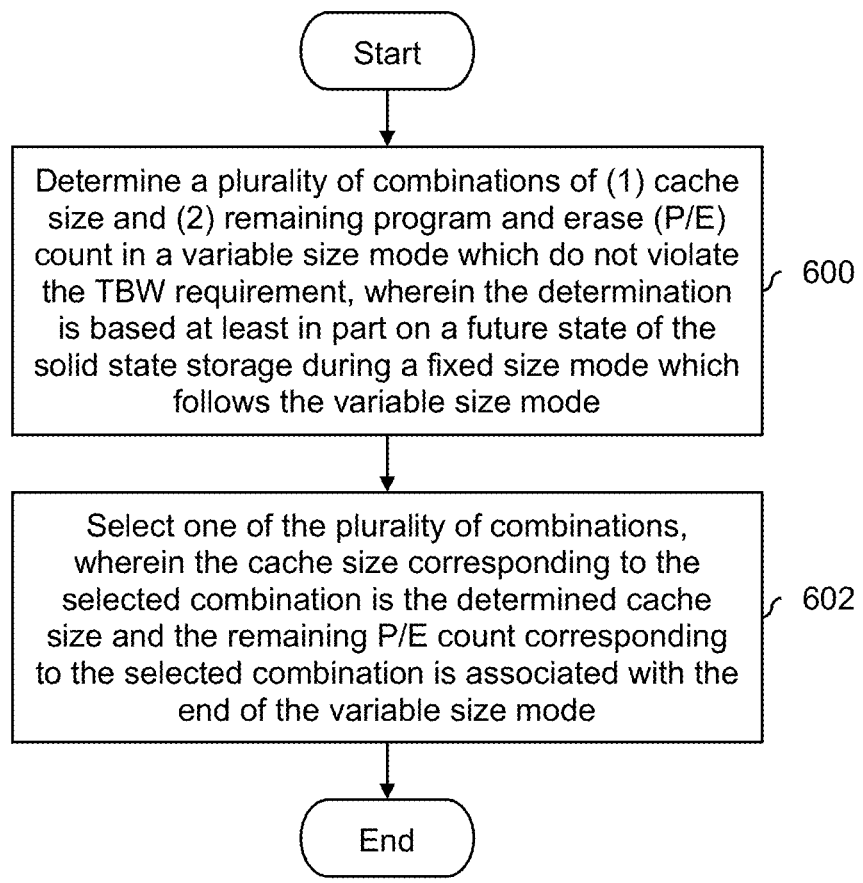
FIG. 6 is a flowchart illustrating an embodiment of a process to determine the size of a cache based at least in part on a future state of the solid state storage system during a fixed size mode.

FIG. 6 is a flowchart illustrating an embodiment of a process to determine the size of a cache based at least in part on a future state of the solid state storage system during a fixed size mode. In some embodiments, step 102 in FIG. 1 includes the process of FIG. 6.

At 600, a plurality of combinations of (1) cache size and (2) remaining program and erase (P/E) count in a variable size mode which do not violate the TBW requirement is determined, wherein the determination is based at least in part on a future state of the solid state storage during a fixed size mode which follows the variable size mode. For example, the future state may include one or more of the following: $PE^{cache}$, $PE^{regular}$, $C^{cache}$, $C^{regular}$, $wA^{cache}$, or $WA^{regular}$ (see Table 1).

At 602, one of the plurality of combinations is selected, wherein the cache size corresponding to the selected combination is the determined cache size and the remaining P/E count corresponding to the selected combination is associated with the end of the variable size mode. Some examples are described above.

Returning to FIG. 1, step 104 is associated with adjusting the size of the cache (and correspondingly, the size of the regular drive) to be the determined size. The following figure describes one example of this.

Figure 7:
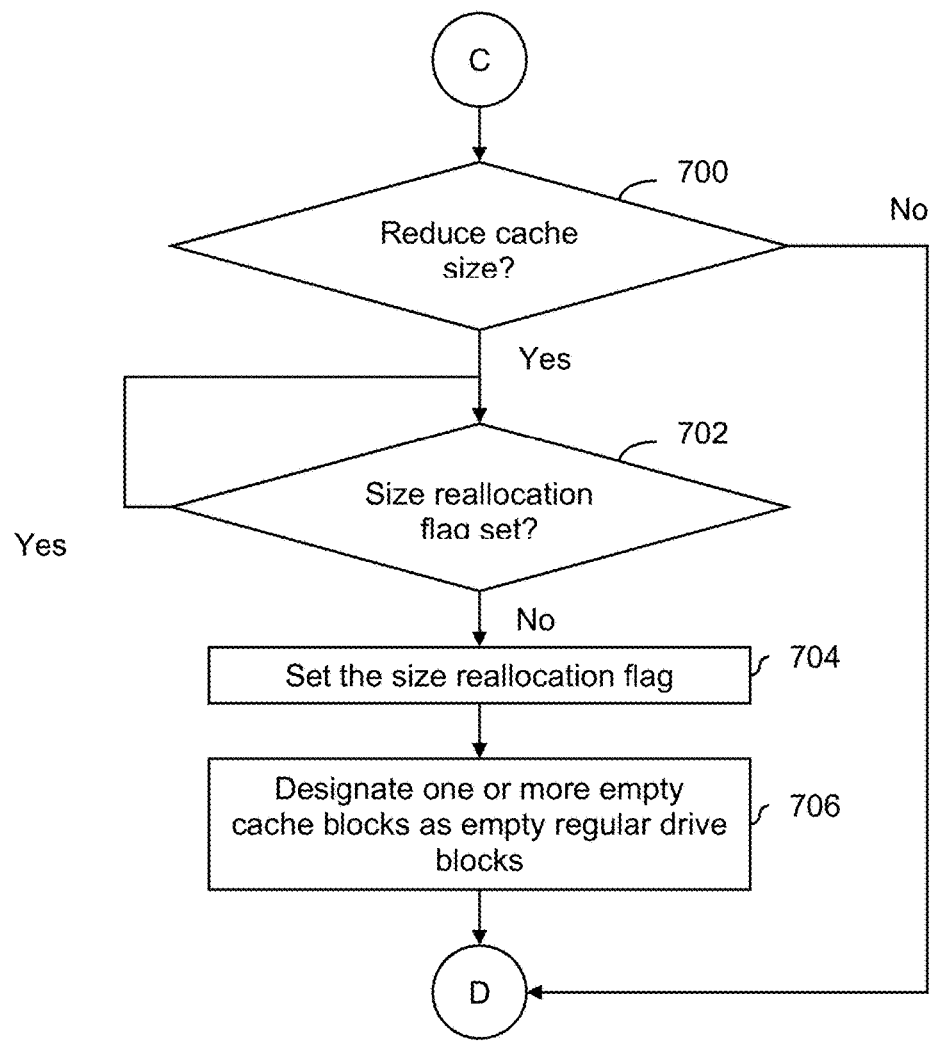
FIG. 7 is a flowchart illustrating an embodiment of a process to downsize a cache.

FIG. 7 is a flowchart illustrating an embodiment of a process to downsize a cache. For example, step 104 in FIG. 1 may include the process of FIG. 7 when the cache needs to be downsized. It is noted that the process of FIG. 7 correspondingly causes the size of the regular drive to increase.

Figure 8:
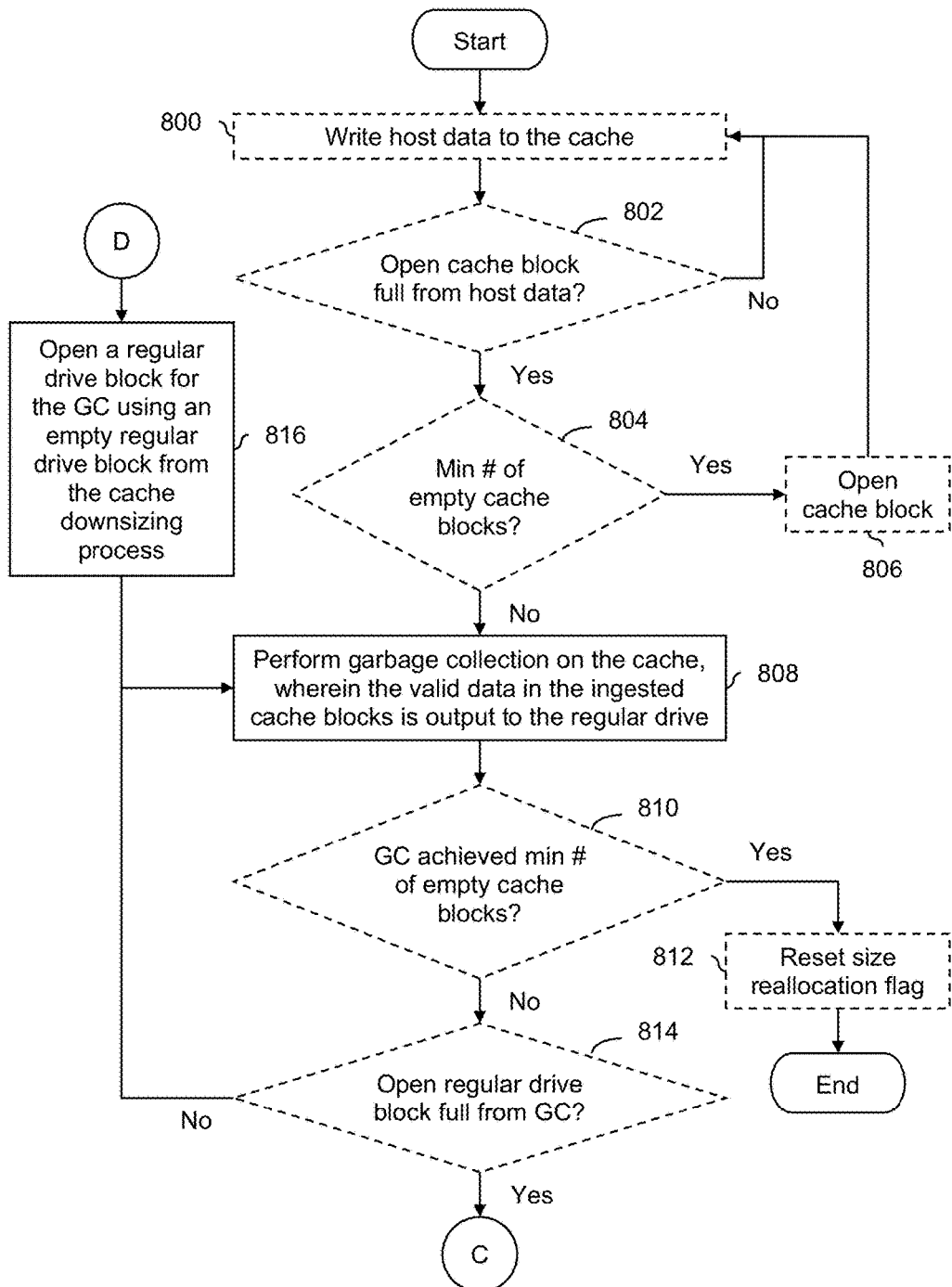
FIG. 8 is a flowchart illustrating an embodiment of a process for writing to solid state storage, including a cache and a regular drive.

At 700, it is determined whether to reduce the cache size. If the cache size does not need to be reduced, then the process ends. (It is noted that in some cases, after ending the process of FIG. 7, step 816 in FIG. 8 is performed next.) This check is to clearly illustrate that FIG. 7 relates to downsizing of the cache (e.g., and not upsizing of the cache).

If it is determined at 700 that the cache size needs to be reduced, it is determined at 702 if the size reallocation flag is set. The size reallocation flag is used to ensure that at most a single resizing operation is running at once. If the size reallocation flag is already set at 702, then the process will continue to check at step 702 until the flag is cleared.

If (or once) the size reallocation flag is clear at step 702, the size reallocation flag is set at 704 (e.g., so that another resizing process cannot be run while this one is running). One or more empty cache blocks are then designated as empty regular drive blocks at 706. Depending upon the implementation, the change may be recorded in a variety of ways (e.g., by changing the (e.g., physical) addresses which correspond to the cache/regular drive and are stored in a logical to physical mapping table, or by notifying the solid state storage drive itself of the change if the solid state storage drive is configured to manage and/or record what portion of itself corresponds to the cache versus the regular drive).

In this particular example, it is assumed that the system maintains a minimum number of free blocks in the cache so that one or more free blocks are available to be transferred to the regular drive. As such, in this example, there is no need to perform garbage collection or otherwise free up cache blocks before the designation at 706. However, after the designation at step 706, there may be a need to perform garbage collection in order to add to the empty cache blocks so that the minimum is satisfied.

Ensuring that there is at least the minimum number of empty cache blocks at all times is beneficial for the scenario when the regular drive is full (e.g., the utilized LBA range equals the user capacity). If the minimum number of empty cache blocks was not maintained, then normally the cache would free up blocks by garbage collecting data from the cache into the regular drive. However, this would not be possible when the regular drive is full because there is nowhere to put the valid data from the cache. As such, it may be desirable to always maintain some minimum number of empty cache blocks should this scenario occur. Another benefit is that the downsizing can be accomplished fairly quickly (e.g., without having to wait for garbage collection, which in some systems is only permitted to occur at certain times and/or after a certain number of host accesses has been performed).

The following figure shows an exemplary larger context in which the cache downsizing process of FIG. 7 may be performed.

FIG. 8 is a flowchart illustrating an embodiment of a process for writing to solid state storage, including a cache and a regular drive. In the example shown, the process illustrates an example of how or when a cache downsizing process may be incorporated into the larger context of a solid state storage system's operation. The process may be performed by a solid state storage controller, such as controller 200 in FIG. 2.

At 800, host data is written to the cache. In this example, newly written data is always written to the cache, even if its final destination is the regular drive. In some cases, the data may remain there, for example if it is classified as hot data, or the host has indicated that the write data should be stored in the cache. Alternatively, the data may be transferred to the regular drive if the data is classified as cold data or the host indicates it should be stored in the regular drive. For example, it may be faster to write to the cache than the regular drive, so to speed up write times, data is first written to the cache and is then copied (if needed) to the regular drive from the cache.

At 802, it is determined whether an open cache block is full from host data. For example, when writing the host data to the cache, the currently-open block in the cache may become full and a new block needs to be opened in the cache to which host data is directed and written. If the open cache block is not full at 802, the process returns to writing host data at step 800. For example, the open cache block may not yet be full and so a new block does not need to be opened.

If it is determined at step 802 that the open cache block is full, it is determined at 804 whether a minimum number of empty cache blocks is available. Similar to the example described above, a minimum number of empty blocks is maintained in the cache. If the minimum number of empty cache blocks is available at step 804, then a cache block is opened at 806 and more host data is written at step 800.

If the minimum number of empty cache blocks is not available at step 804, then at 808 garbage collection is performed on the cache, wherein the valid data in the ingested cache blocks is output to the regular drive. This causes blocks to be freed up in the cache.

At 810, it is determined if garbage collection has achieved the minimum number of empty cache blocks. If so, the size reallocation flag is reset at 812 and the process ends. Note that clearing the flag at step 812 enables another cache resize process to operate (see, e.g., the description of the check at step 702 in FIG. 7).

If the minimum number of empty cache blocks has not been achieved by garbage collection at step 810, then it is determined whether an open regular drive block is full from garbage collection at 814. If so, the process of FIG. 7 is performed (i.e., the cache is downsized, which causes free blocks to be added to the regular drive).

After the process of FIG. 7 is performed, a regular drive block is opened for the garbage collection process using an empty regular drive block from the cache downsizing process at step 816. After opening a regular drive block at step 816, or if it was decided not to open a regular drive block at step 814, garbage collection is performed again at step 808.

The process shown in FIG. 8 is a relatively detailed example. More generally, the process of FIG. 7 may be performed prior to opening a regular drive block at step 816 and then performing garbage collection at step 808. One advantage to incorporating a cache downsizing process into a garbage collection process is that the cache garbage collection process already exists and has had time to be optimized. That is, there already exists a process which reduces the size of the cache (and that process has had time to be refined) so there is no need to "reinvent the wheel." A second advantage is that garbage collection of the cache has to occur, so having the cache downsize operation occur at the same time introduces no new overhead operations.

Naturally, the size of the cache in some cases may increase. The following is an example of such a process.

Figure 9:
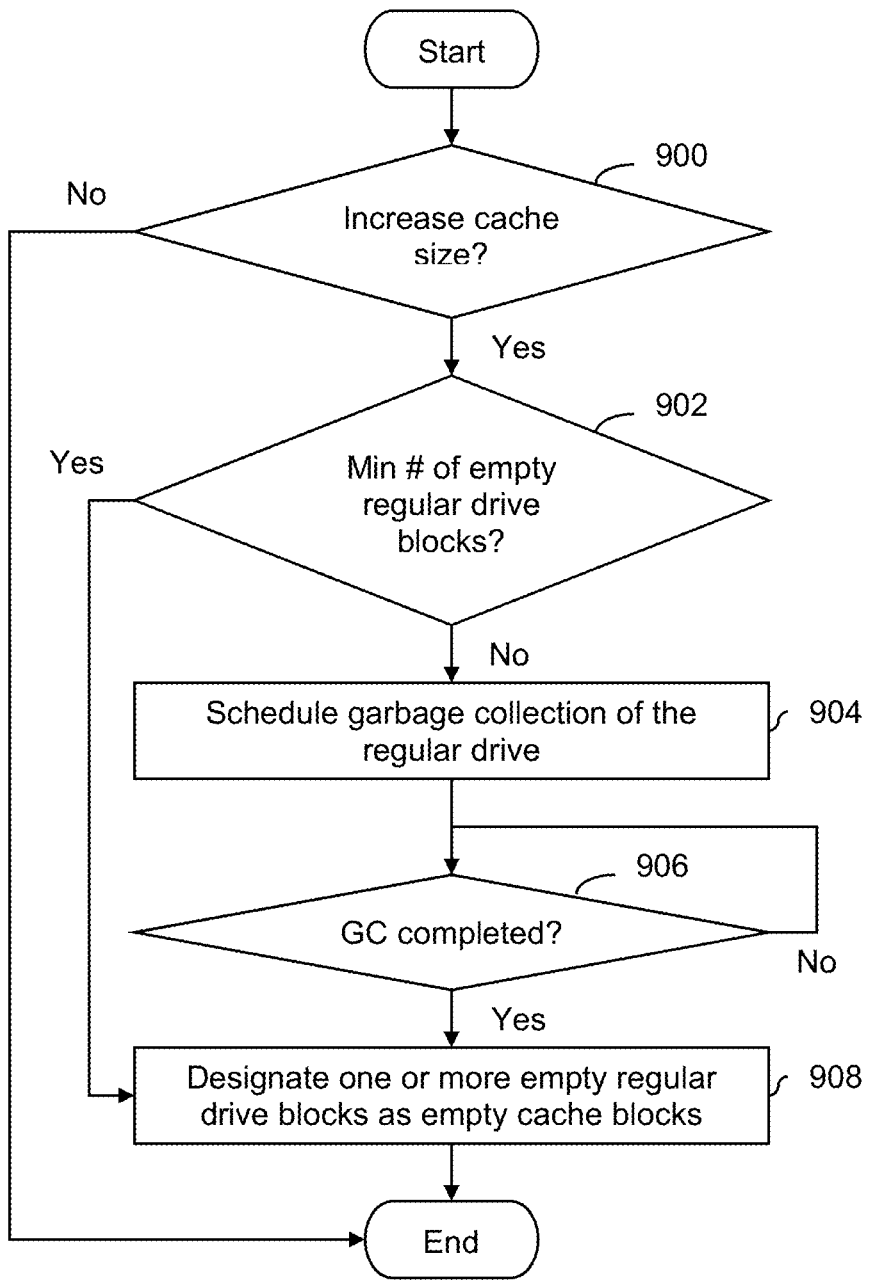
FIG. 9 is a flowchart illustrating an embodiment of a cache upsizing process.

FIG. 9 is a flowchart illustrating an embodiment of a cache upsizing process. In some embodiments, step 104 in FIG. 1 includes the process of FIG. 9. At 900, it is determined whether to increase the cache size. If so, it is determined if a minimum number of empty regular drive blocks is available at 902. As in the above examples, the system ensures there is at least some minimum number of empty blocks in the regular drive (just like the cache).

If the minimum number of empty regular drive blocks is available at 902, one or more empty regular drive blocks are designated as empty cache blocks at 908. If the minimum number of empty regular drive blocks is not available at 902, then the system frees up some by scheduling garbage collection of the regular drive. In this example, garbage collection waits until some predefined time or predefined event so as to keep overhead writes down (e.g., as measured by write amplification).

Step 906 checks to see if garbage collection has completed. The process will wait at step 906 until garbage collection has completed. Once garbage collection has completed at step 906, or if the minimum number of empty regular drive blocks is available at step 902, one or more empty regular drive blocks are designated as empty cache blocks at 908.

Wear leveling is a process by which blocks with lower P/E counts are freed up so that hopefully the newly-freed blocks can be written to, causing the P/E counts across the solid state storage to be more equal. Wear leveling is conducted not only in the cache and regular drive, but also between the cache and the regular drive so that all blocks wear out at the same time (e.g., independent of whether they are in the cache or the regular drive). The following figure shows an example block swapping process which may assist with wear leveling. In some embodiments, the following process is performed in combination with FIG. 1.

Figure 10:
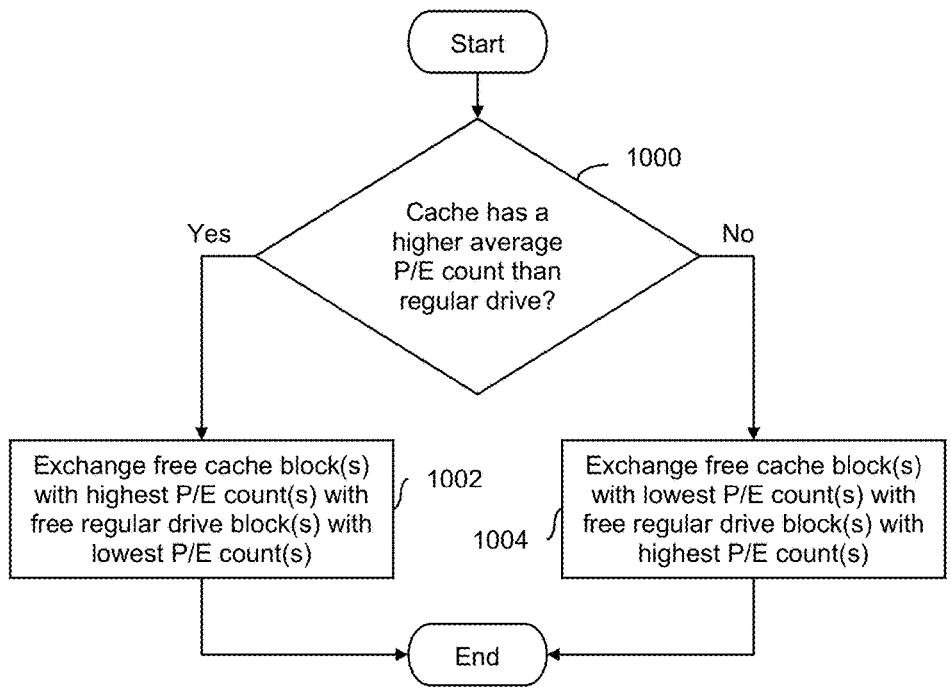
FIG. 10 is a flowchart illustrating an embodiment of a block swapping process which assists with wear leveling.

FIG. 10 is a flowchart illustrating an embodiment of a block swapping process which assists with wear leveling. In the example shown, garbage collection and wear leveling are performed independently on the cache and the regular drive (e.g., where the garbage collection and/or wear leveling processes use different selection techniques for source and/or destination blocks in the cache versus the regular drive), and the process may be performed whenever wear leveling or garbage collection is performed on the cache or the regular drive. In this example it is assumed that the cache and the regular drive each have their own pool of empty or free blocks. There is no (for example) common pool of empty blocks which the cache and the regular drive both share (at least in this example).

At 1000 it is determined if the cache has a higher average P/E count than the regular drive. If so, free cache block(s) with the highest P/E count(s) are exchanged with free regular drive block(s) with the lowest P/E count(s) at 1002. If, on the other hand, the regular drive has a higher P/E count, free cache block(s) with the lowest P/E count(s) are exchanged with free regular drive block(s) with the highest P/E count(s) at 1004.

One benefit to the process described above is that it takes into account current system conditions so that the part of the storage (i.e., the cache or the regular drive) that is getting more worn out gets blocks with low(er) P/E counts from the other part of the drive. Another benefit is that it does not require (additional) data writes, so it has a low overhead and does not affect WA.

Note that the above process is a passive process and a more active or aggressive technique may be performed where additional and/or new garbage collection and/or wear leveling operations are actively triggered to free up and subsequently swap blocks. The process shown in FIG. 10, for example, sits back and waits for blocks to be freed using existing or current garbage collection and/or wear leveling operations. Naturally, the more active or aggressive swapping technique will contribute adversely to WA.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  solid state storage including a cache and being configured to operate in a variable size mode in which the cache is permitted to vary in size and a fixed size mode in which the size of the cache has a fixed size; and
  a solid state storage controller configured to:
    obtain a total bytes written (TBW) requirement associated with the solid state storage;
    determine the size of the cache based at least in part on the TBW requirement and a remaining program and erase (P/E) count;
    adjust the size of the cache to be the determined size when the P/E count is less than a maximum count; and
    transition the solid state storage to the fixed size mode, adjusting the size of the cache to the fixed size, when the remaining P/E count is greater than or equal to the maximum count.

2. The system of claim 1, wherein the solid state storage controller includes a semiconductor device, including one or more of the following: an application-specific integrated circuit (ASIC) or a field-programmable gate array (FPGA).

3. The system of claim 1, wherein the cache includes a plurality of single-level cells (SLC) and a regular drive portion of the solid state storage includes one or more of the following: a plurality of multi-level cells (MLC) or a plurality of tri-level cells (TLC).

4. The system of claim 1, wherein the solid state storage controller is further configured to:
  determine if one or more fixed size mode criteria have been met;
  in the event the fixed size mode criteria have been met:
    obtain a fixed size; and
    adjust the size of the cache to be the fixed size; and
  in the event the fixed size mode criteria have not been met, perform the steps of obtaining, determining, and adjusting.

5. The system of claim 1, wherein the solid state storage controller is configured to determine the size of the cache, including by:
  determining a plurality of combinations of (1) cache size and (2) remaining (P/E) count in the variable size mode which do not violate the TBW requirement; and
  selecting one of the plurality of combinations, wherein a cache size corresponding to the selected combination is the determined cache size and a remaining P/E count corresponding to the selected combination is associated with the end of the variable size mode.

6. The system of claim 5, wherein the determination of the plurality of combinations is based at least in part on a future state of the solid state storage during a fixed size mode which follows the variable size mode.

7. The system of claim 1, wherein:
  the size of the cache is being downsized; and
  the solid state storage controller is configured to downsize the cache, including by:
    determining if a size reallocation flag is set; and
    in the event it is determined that the size reallocation flag is not set:
      setting the size reallocation flag; and
      designating one or more empty cache blocks as empty regular drive blocks.

8. The system of claim 7, wherein the solid state storage controller is further configured to:
  perform a garbage collection process on the cache, wherein valid data in ingested cache blocks is output to the regular drive; and
  open a regular drive block for the garbage collection process using an empty regular drive block from the cache downsizing process.

9. The system of claim 1, wherein the solid state storage controller is further configured to:
  determine if the cache has a higher average program and erase (P/E) count than the regular drive;
  in the event it is determined that the cache has a higher average P/E count, exchange one or more free cache blocks with the highest P/E count(s) with one or more free regular drive blocks with the lowest P/E count(s); and
  in the event it is determined that the regular drive has a higher average P/E count, exchange one or more free cache blocks with the lowest P/E count(s) with one or more free regular drive blocks with the highest P/E count(s).

10. A method, comprising:
  obtaining a total bytes written (TBW) requirement associated with solid state storage that includes a cache and is configured to operate in a variable size mode in which the cache is permitted to vary in size and a fixed size mode in which the size of the cache has a fixed size;
  determining the size of the cache based at least in part on the TBW requirement and a remaining program and erase (P/E) count;
  adjusting the size of the cache to be the determined size when the P/E count is less than a maximum count; and
  transitioning the solid state storage to the fixed size mode, adjusting the size of the cache to the fixed size, when the remaining P/E count is greater than or equal to the maximum count.

11. The method of claim 10, wherein the method is performed by a semiconductor device, including one or more of the following: an application-specific integrated circuit (ASIC) or a field-programmable gate array (FPGA).

12. The method of claim 10, wherein the cache includes a plurality of single-level cells (SLC) and a regular drive portion of the solid state storage includes one or more of the following: a plurality of multi-level cells (MLC) or a plurality of tri-level cells (TLC).

13. The method of claim 10 further comprising:
  determining if one or more fixed size mode criteria have been met;
  in the event the fixed size mode criteria have been met:
    obtaining a fixed size; and
    adjusting the size of the cache to be the fixed size; and in the event the fixed size mode criteria have not been met, perform the steps of obtaining, determining, and adjusting.

14. The method of claim 10, wherein determining the size of the cache includes:
    determining a plurality of combinations of (1) cache size and (2) remaining (P/E) count in the variable size mode which do not violate the TBW requirement; and
    selecting one of the plurality of combinations, wherein a cache size corresponding to the selected combination is the determined cache size and a remaining P/E count corresponding to the selected combination is associated with the end of the variable size mode.

15. The method of claim 14, wherein determining the plurality of combinations is based at least in part on a future state of the solid state storage during a fixed size mode which follows the variable size mode.

16. The method of claim 10, wherein:
    the size of the cache is being downsized; and
    downsizing the cache includes:
        determining if a size reallocation flag is set; and
        in the event it is determined that the size reallocation flag is not set:
            setting the size reallocation flag; and
            designating one or more empty cache blocks as empty regular drive blocks.

17. The method of claim 16 further comprising:
    performing a garbage collection process on the cache, wherein valid data in ingested cache blocks is output to the regular drive; and
    opening a regular drive block for the garbage collection process using an empty regular drive block from the cache downsizing process.

18. The method of claim 10 further comprising:
    determining if the cache has a higher average program and erase (P/E) count than the regular drive;
    in the event it is determined that the cache has a higher average P/E count, exchanging one or more free cache blocks with the highest P/E count(s) with one or more free regular drive blocks with the lowest P/E count(s); and
    in the event it is determined that the regular drive has a higher average P/E count, exchanging one or more free cache blocks with the lowest P/E count(s) with one or more free regular drive blocks with the highest P/E count(s).

19. A computer program product, the computer program product being embodied in a non-transitory computer readable storage medium and comprising computer instructions for:
    obtaining a total bytes written (TBW) requirement associated with solid state storage that includes a cache and is configured to operate in a variable size mode in which the cache is permitted to vary in size and a fixed size mode in which the size of the cache has a fixed size;
    determining the size of the cache associated with the solid state storage based at least in part on the TBW requirement and a remaining program and erase (P/E) count;
    adjusting the size of the cache to be the determined size when the P/E count is less than a maximum count; and
    transitioning the solid state storage to the fixed size mode, adjusting the size of the cache to the fixed size, when the remaining P/E count is greater than or equal to the maximum count.

20. The computer program product of claim 19, wherein determining the size of the cache includes:
    determining a plurality of combinations of (1) cache size and (2) remaining (P/E) count in the variable size mode which do not violate the TBW requirement; and
    selecting one of the plurality of combinations, wherein a cache size corresponding to the selected combination is the determined cache size and a remaining P/E count corresponding to the selected combination is associated with the end of the variable size mode.

* * * * *